United States Patent
Black et al.

(10) Patent No.: US 10,218,684 B2
(45) Date of Patent: Feb. 26, 2019

(54) SECURE DATA TRANSMISSION

(71) Applicant: NCR Corporation, Duluth, GA (US)

(72) Inventors: Jonathan Simon Black, Dundee (GB); Adam Nicholas Brown, Dundee (GB)

(73) Assignee: NCR Corporation, Atlanta, GA (US)

( * ) Notice: Subject to any disclaimer, the term of this patent is extended or adjusted under 35 U.S.C. 154(b) by 149 days.

(21) Appl. No.: 14/610,132

(22) Filed: Jan. 30, 2015

(65) Prior Publication Data

US 2016/0226839 A1    Aug. 4, 2016

(51) Int. Cl.
| | |
|---|---|
| H04L 29/06 | (2006.01) |
| H04W 12/02 | (2009.01) |
| G06Q 20/10 | (2012.01) |
| G06Q 20/18 | (2012.01) |
| H04L 9/32 | (2006.01) |
| H04W 12/04 | (2009.01) |

(52) U.S. Cl.
CPC ..... *H04L 63/0435* (2013.01); *G06Q 20/1085* (2013.01); *G06Q 20/18* (2013.01); *H04L 9/3231* (2013.01); *H04W 12/02* (2013.01); *H04W 12/04* (2013.01); *G06Q 2220/00* (2013.01); *H04L 63/0428* (2013.01); *H04L 63/061* (2013.01); *H04L 63/062* (2013.01)

(58) Field of Classification Search
CPC . H04L 63/0435; H04L 63/061; H04L 63/062; H04L 9/3231; H04L 63/0428; G06C 2220/00; G06C 20/1085; G06C 20/18; G06Q 20/1085; G06Q 20/18; G06Q 2220/00; H04W 12/02; H04W 12/04
USPC ........................................................ 713/171
See application file for complete search history.

(56) References Cited

U.S. PATENT DOCUMENTS

| | | | |
|---|---|---|---|
| 2002/0078361 A1* | 6/2002 | Giroux | H04L 63/0428 713/183 |
| 2003/0147408 A1* | 8/2003 | Datta | H04L 12/2854 370/401 |
| 2005/0207569 A1* | 9/2005 | Zhang | H04L 29/06 380/28 |
| 2008/0232768 A1* | 9/2008 | Desineni | H04L 65/4092 386/331 |
| 2010/0232337 A1* | 9/2010 | Das | H04W 4/12 370/312 |
| 2010/0305730 A1* | 12/2010 | Glitsch | G06F 17/30026 700/94 |
| 2012/0214416 A1* | 8/2012 | Kent | H04L 63/18 455/41.2 |
| 2012/0330845 A1* | 12/2012 | Kang | G06Q 40/02 705/71 |

(Continued)

FOREIGN PATENT DOCUMENTS

| | | | | |
|---|---|---|---|---|
| WO | 2013/102003 | 7/2013 | | |
| WO | WO 2013102003 A1 * | 7/2013 | ............. | G06F 21/34 |

OTHER PUBLICATIONS

European Search Report issued in co-pending European Patent Application 15194629.0 dated May 24, 2016.

*Primary Examiner* — Yogesh Paliwal
(74) *Attorney, Agent, or Firm* — Schwegman, Lundberg & Woessner

(57) ABSTRACT

A first device transmits data as encrypted portions that are communicated to one or more second devices as one or more of: a graphical animation rendered to a screen on a display of the first device and audio played out a speaker of the first device.

12 Claims, 4 Drawing Sheets

(56) References Cited

U.S. PATENT DOCUMENTS

2013/0086465 A1* 4/2013 Boudville ............. G07F 19/201
                                                        715/234
2015/0178721 A1* 6/2015 Pandiarajan ......... G06Q 20/382
                                                         705/75

* cited by examiner

SECURE DATA TRANSMISSION

BACKGROUND

There are a variety of situations in the networking industry where a communication connection between two devices may not be possible or may be actively prohibited for security reasons.

For example, consider a situation where a customer engineer needs to establish a service connection with an Automated Teller Machine (ATM) to obtain an ATM transaction log. The ATM in question may have a malfunctioning Universal Serial Bus (USB) port (or even lack a USB port) and may not have the ability to communicate with a device of the customer engineer through WiFi or BLUETOOTH®. The customer engineer may be able to authenticate and access the ATM transaction log on the ATM but has no means to acquire the ATM transaction log, which the customer engineer is in need of. Moreover, the ATM may lack the ability to send the ATM log to a remote network server on behalf of the customer engineer because the ATM's network access is restricted to ATM networks that are tightly controlled for security reasons with limited or no access to other non-ATM networks.

In such a situation, the customer engineer has no ability to obtain the ATM transaction log because no conventional communication connection can be made to the ATM to obtain the ATM transaction log. This is even when it is clear that the customer engineer has authorized permission and may be required to obtain the ATM transaction log from the ATM.

There are other examples as well, which are not restricted to an ATM-use case where an individual has credentials and proper authority to access a file or piece of information from a device but lacks any ability to establish a software connection to that device using a device operated by the individual.

It is noted that it may not just be the case that the device having a file of interest to a user lacks an ability to establish a software connection with the user's device. That is, the user's device may lack an ability to use a software connection mechanism provided by the device having the file of interest.

It may also be as simple as the mechanism for obtaining a file of interest is through a portable memory device inserted into a USB/Secure Digital (SD) port of the device having the file, but the user lacks any portable memory device when present at the device having the file of interest. Here, the issue is one of convenience but it can be a significant inconvenience to the user depending upon the circumstances of the user.

Accordingly, there is a need for securely obtaining a file or data between at least two devices without a conventional software connection mechanism (USB, SD, WiFi, Ethernet, BLUETOOTH®, etc.).

SUMMARY

In various embodiments, methods and a Self-Service Terminal (SST) for securely transmitting data are presented.

According to an embodiment, a method for secure data transmission is presented. Specifically, data is encrypted on a device and the encrypted data is divided into portions. Next, the portions are broadcast from the device as one of: a graphical animation rendered on a screen of a display of the device and audio output through a speaker of the device.

DETAILED DESCRIPTION

Figure 1:
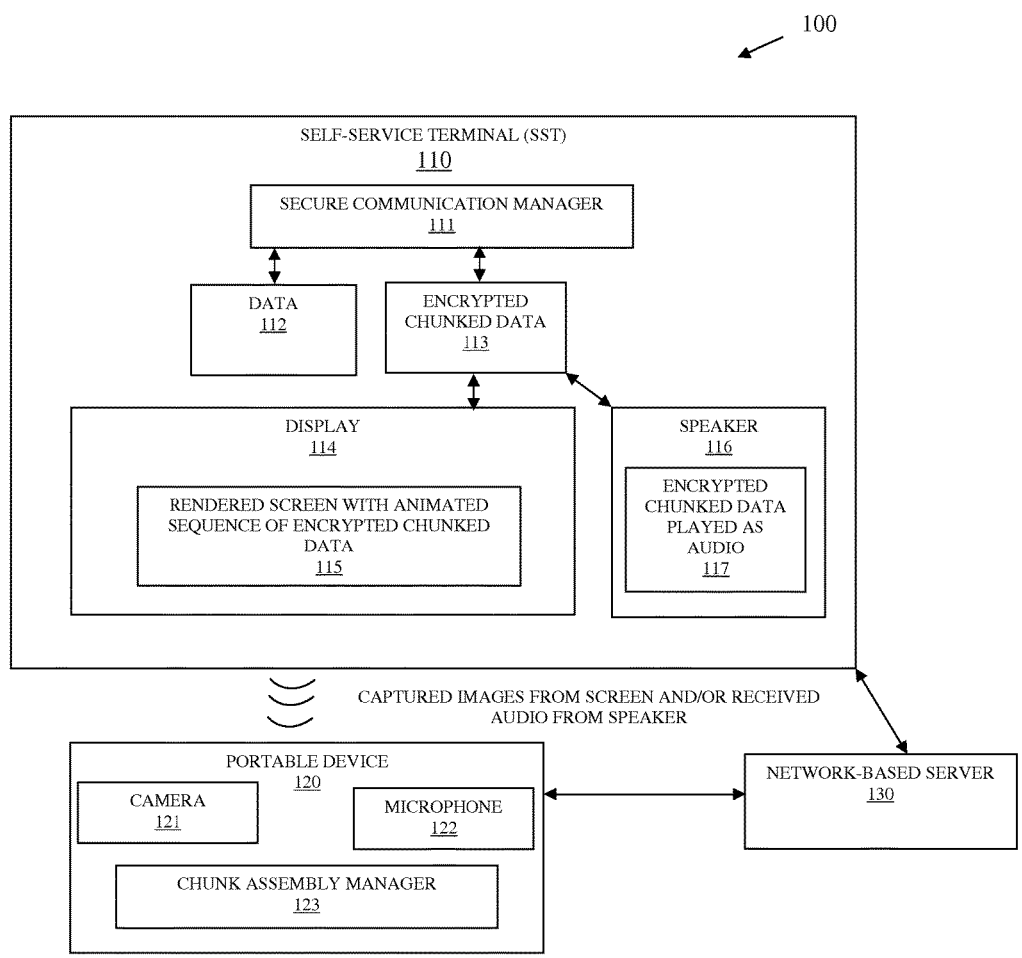
FIG. 1 is a diagram of a secure data transmission system, according to an example embodiment.

FIG. 1 is a diagram of a secure data transmission system 100, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of secure data transmission, presented herein and below.

The secure data transmission system 100 includes a Self-Service Terminal (SST referred to herein as an Automated Teller Machine (ATM) for the embodiment discussed in the FIG. 1), a portable device 120, and, optionally, a network-based server 130. The ATM 110 includes a secure communication manager 111, a display 114, and, optionally, a speaker 116. The portable device 120 includes a camera 121, a microphone, and a chunk assembly manager 123.

The secure communication manager 111 is implemented as one or more software modules as executable instructions that reside in memory of the ATM 110 and/or non-transitory computer-readable storage medium of the ATM 110. The executable instructions execute on one or more processors of the ATM 110.

The secure communication manager 111 takes as input data 112 (such as ATM service data (ATM transaction log, event information, status information, state information, and the like)).

The secure communication manager 111 outputs encrypted chunked data. That is, the secure communication manager 111 takes the ATM service data 112 as input and outputs the ATM service data 112 as chunks of data in an encrypted format.

In an embodiment, the encryption processed on the data 112 complies with Advanced Encryption Standard (AES). The key used for encryption is symmetric meaning that decryption can use the same key to perform decryption on the encrypted chunks.

It is noted that in other cases, asymmetrical encryption can be used, such as Public-Private key pairs and other techniques.

Again, the secure communication manager 111 can encrypt the entire data 112 to be communicated before chunking the data into the chunks or can perform the encryption on each chunk after the data 112 has been chunked.

Next, the secure communication manager 111 encodes the data after encryption using Base64 encoding. This reduces the character set used and provides flexibility when rendering the chunked data to the screen 115.

After the data 112 has been encrypted and encoded, the secure communication manager 111 chunks the encrypted and encoded data. This entails splitting the encrypted and encoded data into smaller parts (similar to packets)

The size of each chunk of ATM service data 112 can be predefined (within the processing logic of the secure communication manager 111) or dynamically determined by the secure communication manager 111 based on an overall size associated with the ATM service data 112 and/or based on the data types and/or original format of the data 112. Once the size of each chunk is resolved (chunk sizes can be fixed sizes or variable sizes), a total number of chunks for the data 112 based on its size is determined.

The total number of chunks can be provided as metadata carried with each chunk, or alternatively the metadata is carried with just a first transmitted chunk. In an embodiment, the size of each chunk is provided as metadata and carried with each chunk.

In addition each chunk includes a sequence number from 1 to N, where in is the last chunk and equal to the total number of chunks. The sequence number is also carried as media data with each chunk. The sequence number permits the chunks to be broadcast (discussed below) from the ATM 110 out of order and later reassembled in the proper order based on each chunk's sequence number. So, the sequence number provides a mechanism for defining and reassembling the data 112 in a proper order by a receiving device (discussed below).

It is noted that the encryption and encoding may be performed before the secure communication manager 111 chunks the data or after the data 112 has already been chunked by the secure communication manager 111 (so breaking the data 112 into chunks occurs before encryption and encoding).

Next, the secure communication manager 111 renders the encrypted and encoded data chunks for communication. Here, the chunks are converted into Quick Response (QR) codes animated and rendered to a screen 115 of the display 114 for the ATM 110, or the chunks are converted into audible sounds played as audio 117 through a speaker 116 of the ATM 110.

So, in an embodiment, secure communication manager 111 then converts/renders each encrypted chunk of data (having a sequence number and a total number of chunks for all the data 112 as metadata) into a graphic (such as a QR code) presentation and streams the graphics in succession to a rendered screen 115 of the display 144 of the ATM 110. So, the secure communication manager 111 creates an animation by display each graphic within the screen 115 of the display 114 for a predetermined period of time.

In an embodiment, 10 QR codes (10 chunks of encrypted data) are rendered to the screen 115 per second. This may be viewed as playing or animating the chunks of data to the screen 115 of the display 114. In such a situation, a camera 121 may catch 7 QR codes per second, but the secure communication manager 111 continues to re-broadcast the animation until the portable device 120, via the camera 121, has each chunk of data representing the data 112. The chunk assembly manager 123 uses the metadata of the chunks to determine when each sequenced chunk of data is acquired by the portable device 120.

In an embodiment, the rate at which the secure communication manager 111 plays the animation of the QR codes (encrypted and encoded data chunks) can be configured for the environment of the ATM 110 to account for lighting in the environment, light pollution, brightness and resolution of the display 114, and other factors.

In an embodiment, the secure communication manager 111 converts the encrypted and encoded chunks of data into audio waves at a frequency that is inaudible to a human or animal. The frequency can also be configured to any desired frequency. The audio waves at the configured frequency are played out of the speaker 116 of the ATM 110.

So, the secure communication manager 111 causes a broadcast of the data 112 to be played as encrypted and encoded chunks (portions) of the data as an animation within the screen 115 of the display and/or as audio waves out the speakers 116.

In an embodiment, the secure communication manager 111 both plays the graphical animation as a series of QR codes and also plays the audio waves. The animation may or may not be in synch with the audio during the playing of both from the ATM 110.

The portable device 120 is operated by a customer engineer (for the embodiments discussed with the FIG. 1, but it is noted that this can be any user operating any portable device (mobile phone, laptop, tablet, wearable processing device, and the like).

The customer engineer may affirmatively point the camera 121 of the device 120 to capture the animated graphic rendered on the screen 115 having sequenced, encrypted, and encoded chunks of the data 112. The captured chunks are obtained by the chunk assembly manager 123 on the device.

The chunk assembly manager 123 represents one or more software modules represented as executable instructions, which reside in memory and/or non-transitory computer-readable storage media on the device 120 and which one or more processors of the device 120 execute.

The chunk assembly manager 123 acquires the metadata of each received chunk of data to identify the sequence number for each chunk and the total number of chunks that can be expected. An alert can be rendered to a screen on the display of the device 120 when the chunk assembly manager 123 detects that the customer engineer has stopped pointing the camera at the screen 115 and the chunk assembly manager 123 has detected that there are still missing chunks that need to be obtained.

In another embodiment, the customer engineer passively (without any required action) obtains the chunks of data via a microphone 122 that detects the frequency of the audio waves playing the chunks of data as inaudible audio waves. In this manner, when the portable device 120 is a smaller device, such as a phone, the customer engineer can acquire the data 112 without even knowing that the data 112 is being required or while performing other tasks unrelated to obtaining the data 112.

Here, the audio waves representing the chunked data are acquired by the chunk assembly manager 123 through the microphone 122 and once all chunks are determined to have been received an alert (audible through a speaker of the device 120 and/or visual through rendered information to a screen of the device 120) can be communicated to the customer engineer indicating that the data 112 was obtained from the ATM 110.

Once all the encrypted and encoded chunks of data are obtained on the portable device 120, the chunk assembly manager 123 assembles all the chunks by sequence number into a complete data file for the data 120.

The chunk assembly manager 123 then decodes the data file (to account for the encoding in Base64) to produce a decoded data file.

In an embodiment, the chunk assembly manager 123 uses a symmetric key that it already has and shares with the secure communication manager 111 to decrypt the decoded data file to produce a decrypted data file.

In an embodiment, the chunk assembly manager 123 may not possess the symmetric key needed to decrypt the decoded data file (this may be done for security purposes). In such a case, the chunk assembly manager 123 uses a network connection available to the device 120 (such as WiFi, cellular, satellite, etc.) to connect with the network server 130. The decoded data file is then provided by the chunk assembly manager 123 to the network server 130, and the network server 130 returns the decrypted data file. In some cases, the customer engineer may be prompted to authenticate with credentials to the network server 130. In other cases, the chunk assembly manager 123 may provide credentials directly to the network server 130 to authenticate the customer engineer and/or the device 120.

Once the chunk assembly manager 123 has the decrypted data (either by decryption processed by the chunk assembly manager 123 or by requesting decrypting of the network server 130), the chunk assembly manager 123 can save the decrypted data as a file on the device 120. Save the decrypted data as a file with the network based server 130, and/or render the decrypted data as the original ATM data 112 of the ATM 110 within a screen on a display of the device 120 for the customer engineer to immediately review and take action on it if need be while at the ATM 110. In some cases, the customer engineer can forward the file via email and/or text from the device 120 to an email address or a different device's phone number.

In an embodiment, the chunk assembly manager 123 does not immediately save the decrypted data as a file but makes it available from memory of the device 120 and the customer engineer decides whether to save it to a storage file on the device 120.

The initial broadcasting by the secure communication manager 111 can be initiated in a number of ways. For example, the secure communication manager 111 may be configured to regularly broadcast the data 112 at predefined times of the day, days of the week, and/or calendar dates. An event may trigger the secure communication manager 111 to broadcast the data 112 as well, such as some action taken by the customer engineer (logging into an ATM Interface and requesting the broadcast, logging in and authenticating to the ATM interface, hitting a predefined key sequence on the ATM that initiates the broadcast and others). In an embodiment, the secure communication manager 111 may be configured to always broadcast the data 112, such as through inaudible sound through the speaker 116 or through a small rendered screen 115 on the display 114 of the ATM 110 that does not interfere with other screens rendered on the display 114 (this may be particularly useful when the ATM 110 is not in use and may be displaying advertisements in the other screens and/or instructions for using the ATM 110).

In an embodiment, some features of the chunk assembly manager 123 are processed by the network-based server 130 on behalf of the portable device 120. For example, the ordering of the chunks of data and assembly to a single file can be relayed from the portable device 120 for the network-based server 130 to produce a single file, which the network-based server 130 may or may not have decrypted on behalf of the portable device 120. In this manner, the portable device 120 may act as an intermediary or thin client with some or most of the processing associated with the chunks of encrypted and encoded data handled by the network-based server 130 on behalf of the portable device 120.

In an embodiment, the secure communication manager 111 and the chunk assembly manager 123 obtain an initial symmetric key for use in encryption and decryption through separate secure sessions with the network-based server 130. That is, the network-based server 130 distributes the symmetric keys and decides when they should change based on a variety of factors evaluated by the network-based server 130 and/or valuated by the secure communication manager 111 and requested of the network-based server 130.

Thus, in one embodiment, the secure communication manager 111 may also communicate though a convention network connection with the network-based server 130. This may also be useful when more security for the data 112 is needed. For example, suppose the initial broadcast is to be directed at just the portable device 120 of a specific customer engineer. The customer engineer may use an interface of the portable device 120 to log on and identify the need for the data to the network-based server 130. The network-based server either sends a public key for the customer engineer/portable device 120 to the secure communication manager 111 or sends an identifier for the customer engineer/portable device 120 to the secure communication manager 111 when the secure communication manager maintains a list of public keys for authorized customer engineers/portable devices. The network-based server 130 then instructs the secure communication manager 111 to broadcast the data 112. Here, the secure communication manager 111 uses the public key of the customer engineer/portable device 120 to custom encrypt the data 112 animated or played on the display 114 or speaker 116 for just the customer engineer/portable device 120. In a similar manner, the customer engineer may dynamically acquire the public key of the secure communication manager 111 from the network-based server 130 for decryption of the animated or played data for capturing on the device 120. Again, if the chunk assembly manager 123 already has the public key of the secure communication manager 111, then dynamic acquisition is not required.

In an embodiment, the network-based server 130 can direct the secure communication manager 111 as to when to broadcast the data 112 and as to when to stop broadcasting the data 112. This may be done independently by the network-based server 130 based on the evaluation of policies or rules or may be done upon a request made by the customer engineer through an interface of the portable device or upon request by an administrator with proper authority to make such a request.

In an embodiment, the network-based server 130 dynamically configures the secure communication manager 111 with rules or policies for the secure communication manager 111 to independently determine when and when not to broadcast the data 112.

One now appreciates how data 112 can be communicated from one device (ATM 110) to another device (portable device 120) without there being any software connection, wired connection, or wireless connection between the two devices. This provides secure end-to-end data transmission in a secure manner (encrypted data) from a source (ATM 110) to an endpoint device (portable device 120). Thus, existing security of networks and connections associated with the ATM 110 are not compromised in any manner with the approaches discussed herein. Additionally, the data 112 being broadcasted can only be read if somehow it were compromised (decrypted by an unauthorized device), which means software and hardware resources of the ATM 110 remain secure even if the data 112 were somehow compromised. Still further, the data 112 can be actively captured by the portable device 120 through the camera 121 or passively captured by the portable device 120 through the microphone 122.

Some of embodiments of the FIG. 1 and other embodiments are now discussed with reference to the FIGS. 2-4.

Figure 2:
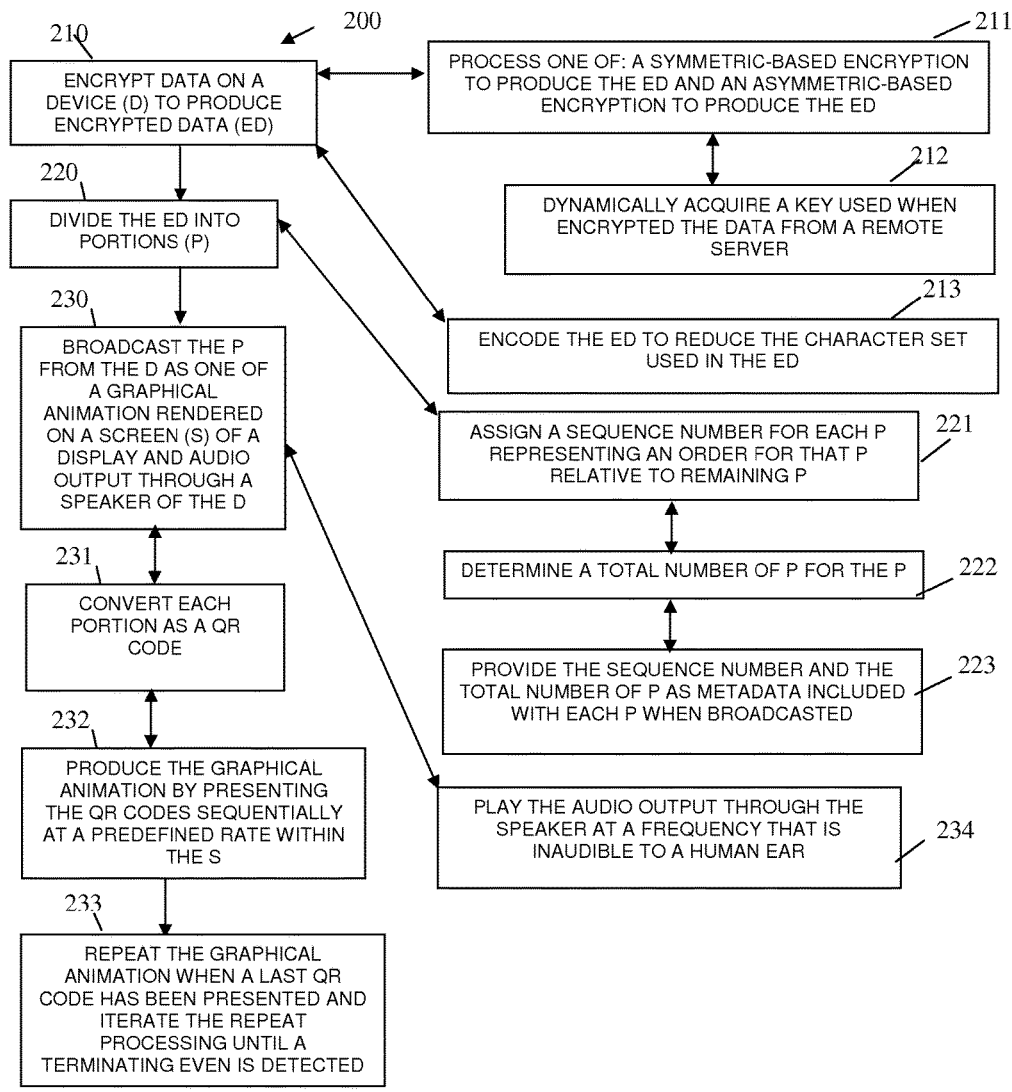
FIG. 2 is a diagram of a method for secure data transmission, according to an example embodiment.

FIG. 2 is a diagram of a method 200 for secure data transmission, according to an example embodiment. The software module(s) that implements the method 200 is referred to as a "data broadcast manager." The data broadcast manager is implemented as executable instructions programmed and residing within memory and/or a non-transitory computer-readable (processor-readable) storage medium and executed by one or more processors of a device. The processor(s) of the device that executes the data broadcast manager are specifically configured and programmed to process the data broadcast manager. The data broadcast manager may have access to one or more network connections during its processing. The network connections can be wired, wireless, or a combination of wired and wireless. In an embodiment, the data broadcast manager lacks any network connection and lacks any capability to communicate over a wired or wireless network connection.

In an embodiment, the device that executes the data broadcast manager is the ATM 110 of the FIG. 1.

In an embodiment, the device that executes data broadcast manager is a Self-Service Terminal (SST).

In an embodiment, the device that executes the data broadcast manager is a kiosk.

In an embodiment, the data broadcast manager is the secure communication manager 111 of the FIG. 1.

At 210, the data broadcast manager encrypts data on a device. Encryption can be done in a variety of manners, such as through an AES approach as discussed above with the FIG. 1.

According to an embodiment, at 211, the data broadcast manager processes a symmetric-based encryption algorithm to produce the encrypted data and/or an asymmetric-based encryption algorithm to produce the encrypted data. A Public-Private key pair approach may use both a symmetric (public key piece) and asymmetric (private key piece) approach.

In an embodiment of 211 and at 212, the data broadcast manager dynamically acquires a key used when encrypting the data from a remote server. This embodiment was discussed above with reference to the FIG. 1. In an embodiment, the remote server is the network-based server 130 of the FIG. 1.

In an embodiment, at 213, the data broadcast manager encodes the encrypted data to reduce the character set used in the encrypted data. For example, a Base64 encoding as discussed above with the FIG. 1.

At 220, the data broadcast manager divides the encrypted data into portions (chunks as discussed above with the FIG. 1).

According to an embodiment, at 221, the data broadcast manager assigns a sequence number for each portion representing an order for that portion relative to remaining portions.

In an embodiment of 221 and at 222, the data broadcast manager determines a total number of portions for the portions.

In an embodiment of 222 and at 223, the data broadcast manager provides the sequence number and the total number of portions as metadata included with each portion when broadcasted (at 230).

At 230, the data broadcast manager broadcasts the portions from the device as one of: a graphical animation rendered on a screen of a display of the device and audio output through a speaker of the device.

In an embodiment, at 231, the data broadcast manager converts each portion as a QR code.

In an embodiment of 231 and at 232, the data broadcast manager produces the graphical animation by presenting the QR codes sequentially at a predefined rate within the screen.

In an embodiment of 232 and at 233, the data broadcast manager repeats the graphical animation when a list QR code has been presented and then iterates the processing of 232 and 233 until a terminating event is detected.

In an embodiment, at 234, the data broadcast manager plays the audio output through the speaker at a frequency that is inaudible until to a human ear and/or an animal ear.

In an embodiment, the data broadcast manager produces the graphical animation as a High Capacity Color Barcode.

In an embodiment, the data broadcast manager produces the graphical animation as a hidden an non-detectable to a human eye watermark or code embedded within an existing image or video that places within a screen rendered to a display of a device that executes the data broadcast manager. So, advertisements or educational information may be presented as images or a video on a display of a POS terminal or SST within a retail establishment and hidden within those images and/or video is the encrypted data transmission being produced and provided by the data broadcast manager.

In an embodiment, the data broadcasted occurs via audio that is inaudible over speakers associated with a SST or POS terminal that processes the data broadcast manager within a retail establishment. The data relevant to advertisements, offers, consumer assistance, or educational information. Consumers within the retail establishment have mobile devices, such as phones, that pick up the data as audio without the consumers being aware of such data transmission. Mobile applications processing on the mobile devices can then provide a decrypted version of the data transmission in the manners discussed herein via speakers or rendered screens to displays of the mobile devices. In cases where asymmetric data encryption is used by the data broadcast manager, education information, offers, requests, etc. can be custom communicated by the retailer to a specific consumer in this manner as well.

Figure 3:
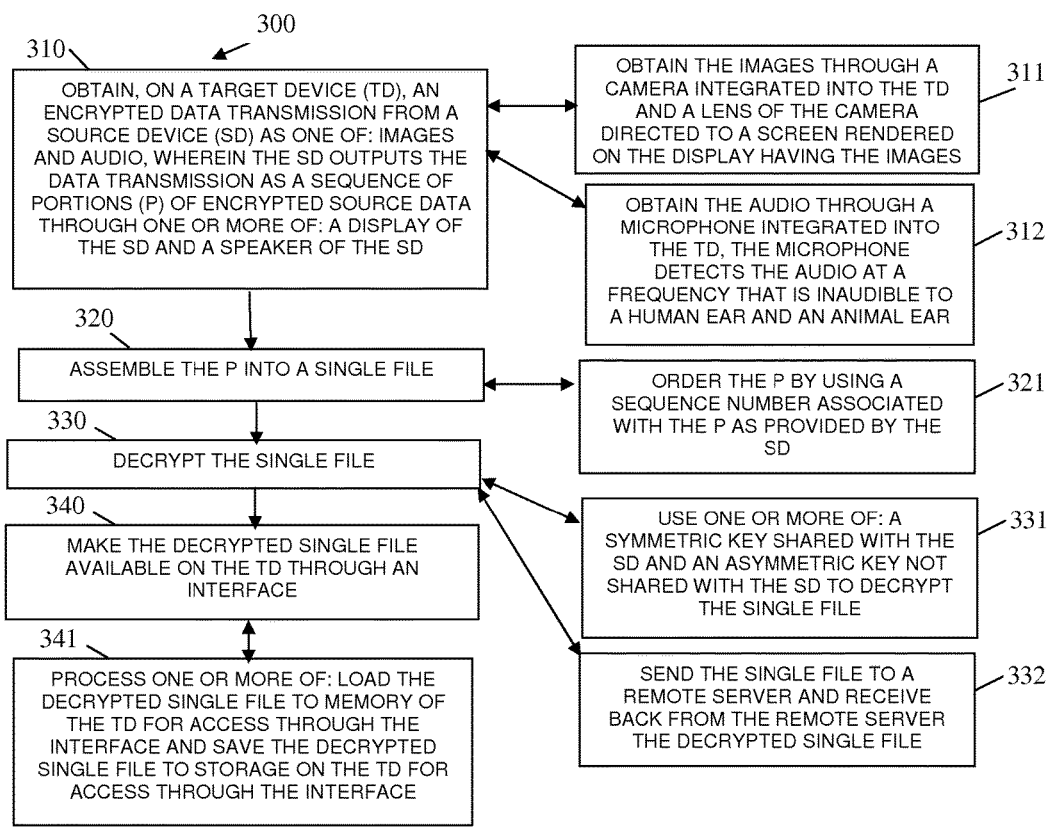
FIG. 3 is a diagram of another method for secure data transmission, according to an example embodiment.

FIG. 3 is a diagram of another method 300 for secure data transmission, according to an example embodiment. The software module(s) that implements the method 300 is referred to as a "mobile data agent." The mobile data agent is implemented as executable instructions programmed and residing within memory and/or a non-transitory computer-readable (processor-readable) storage medium and executed by one or more processors of a device. The processors that execute the mobile data agent are specifically configured and programmed to process the mobile data agent. The mobile data agent has access to one or more network connections during its processing. The network connections can be wired, wireless, or a combination of wired and wireless. In an embodiment, the mobile data agent lacks any access to a conventional network during processing of the mobile data agent.

In an embodiment, the device that executes the mobile data agent is the portable device 120 of the FIG. 1.

In an embodiment, the device that executes mobile data agent is a mobile phone.

In an embodiment, the device that executes the mobile data agent is a tablet.

In an embodiment, the device that executes the mobile data agent is a laptop.

In an embodiment, the device that executes the mobile data agent is a wearable processing device.

In an embodiment, the mobile data agent is the chunk assembly manager 123 of the FIG. 1.

At 310, the mobile data agent obtains, on a target device, an encrypted data transmission from a source device as one of: images and audio. The source device outputs the data transmission as a sequence of portions of encrypted source data through one or more of: a display of the source device and a speaker of the source device.

In an embodiment, at 311, the mobile data agent obtains the images through a camera integrated into the target device and a lens of the camera directed to a screen rendered on the display having the images.

In an embodiment, at 312, the mobile data agent obtains the audio through a microphone integrated into the target device. The microphone detects the audio at a frequency that is inaudible to a human ear and an animal ear.

At 320, the mobile data agent assembles the portions into a single file.

In an embodiment, at 321, the mobile data agent orders the portions by using a sequence number associated with each portion as provided by the source device.

At 330, the mobile data agent decrypts the single file.

In an embodiment, at 331, the mobile data agent uses one or more of: a symmetric key shared with the source device and an asymmetric key not shared with the source device to decrypt the single file.

In an embodiment, at 332, the mobile data agent sends the single file to a remote server and receives back from the remote server the decrypted single file.

At 340, the mobile data agent makes the decrypted single file available on the target device through an interface.

According to an embodiment, at 341, the mobile data agent processes one or more of: loading the decrypted single file to memory of the target device for access through the interface and saving the decrypted file to storage on the target device for access through the interface.

Figure 4:
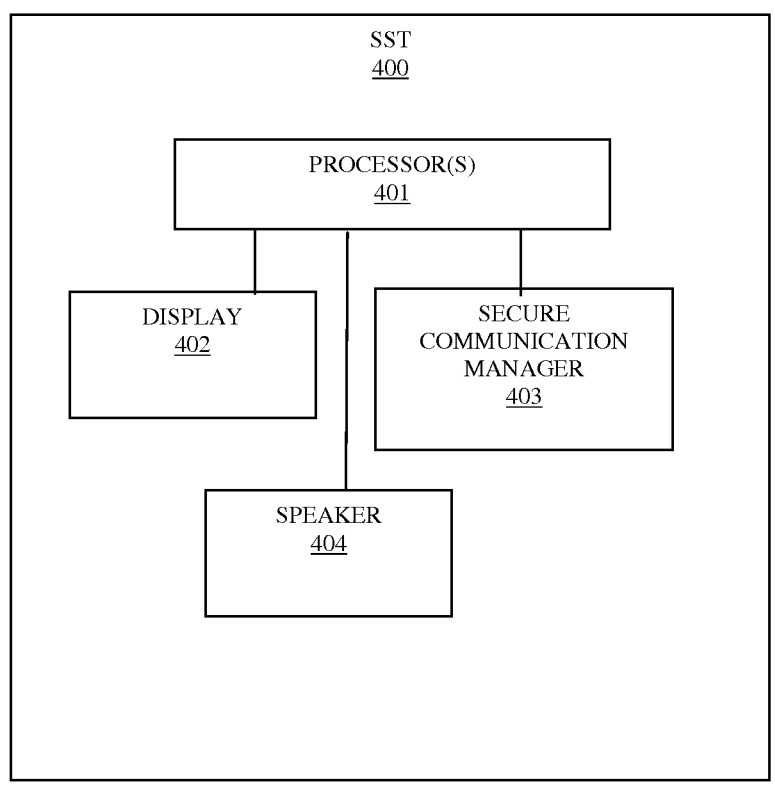
FIG. 4 is a diagram of a Self-Service Terminal (SST), according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400 as executable instructions. The SST 400 may have or may not have access to one or more networks, which can be wired, wireless, or a combination of wired and wireless. In an embodiment, the SST 400 lacks any ability to communicate over a conventional wired or wireless network.

In an embodiment, the SST 400 is configured to implement, inter alia, the system 100 of the FIG. 1.

In an embodiment, the SST 400 is configured to implement, inter alia, the method 200 of the FIG. 2.

In an embodiment, the SST 400 is configured to implement, inter alia, the method 300 of the FIG. 3.

In an embodiment, the SST 400 is configured to implement all and/or various combinations of the system 100, the method 200, and the method 300.

The SST 400 includes at least one processor 401, a secure communication manager 402, and a display 403. In an embodiment, the SST 400 also includes a speaker 404.

In an embodiment, the SST 400 is the ATM 110 of the FIG. 1.

In an embodiment, the SST 400 is kiosk.

The secure communication manager 402 is configured to: execute on the processor 401 and broadcast data that is resident on the SST 400 as encrypted data that is rendered as graphical portions within a screen of the display 403 for transmission to a receiving device.

In an embodiment, the secure communication manager 402 is the secure communication manager 111 of the FIG. 1.

In an embodiment, the secure communication manager 402 is the method 200 of the FIG. 2.

According to an embodiment, the SST 110 also includes a speaker 404. In this embodiment, the secure communication manager 402 is further configured to output the encrypted data as audio waves through the speaker 404 for transmission to the receiving device.

In an embodiment of the last embodiment, the secure communication manager 402 outputs the audio waves in a frequency that is inaudible and undetected by humans and animals.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

receiving, on a device, a device identifier for a portable device responsive to a request from the portable device for a file located on the device, wherein receiving further includes receiving the device identifier from a server;

obtaining, by the device, a public key associated with the portable device from a list of public keys maintained on the device based on the device identifier;

encrypting, by the device, the file using the public key, encoding the file, and producing encrypted and encoded data for the file;

dividing, by the device, the encrypted and encoded data into portions; and broadcasting, by the device, the portions from the device as a graphical animation rendered on a screen of a display of the device, wherein the graphical animation is detectable to a camera of the portable device for receiving all portions of the encrypted and encoded data from the device, wherein broadcasting further includes broadcasting the portions out of order.

2. The method of claim 1, wherein dividing further includes assigning a sequence number for each portion representing an order for that portion relative to remaining portions.

3. The method of claim 2, wherein assigning further includes determining a total number of portions for the portions.

4. The method of claim 3, wherein determining further includes providing the sequence number and the total number of portions as metadata included with each portion when broadcasted.

5. The method of claim 1, wherein broadcasting further includes converting each portion as a Quick Response (QR) code.

6. The method of claim 5, wherein converting further includes producing the graphical animation by presenting the QR codes sequentially at a predefined rate within the screen.

7. The method of claim 6 further comprising, repeating the graphical animation when a last QR code has been presented and iterating the repeating until a terminating event is detected.

8. A method, comprising:
logging, by a target device, into a server and identifying to the server a need for file data of a file on a source device;
providing, by the server, a target device identifier for the target device to the source device;
obtaining, on a target device, an encrypted and encoded data transmission representing the file data for the file from the source device that is in communication with the server, wherein obtaining further includes obtaining the encrypted and encoded data as animated images captured from a lens of a camera of the target device, wherein the source device outputs the encrypted and encoded data transmission as a sequence of portions of encrypted and encoded data through a display of the source device where the images are animated and rendered, the encrypted and encoded data is encrypted by the source device using a public key of the target device maintained on the source device based on the target device identifier, wherein obtaining further includes receiving the sequence of portions out of order by the target device;
assembling the portions into the file;
decrypting the file into a decrypted file using a target device asymmetric key for the target device; and
making the decrypted file available on the target device through an interface.

9. The method of claim 8, wherein assembling further includes ordering the portions by using a sequence number associated with each portion as provided by the source device.

10. The method of claim 8, wherein decrypting further includes sending the file to the server that maintains the source device asymmetric key and receiving back from the server the decrypted file.

11. The method of claim 8, wherein making further includes one or more of: loading the decrypted file to memory of the target device for access through the interface and saving the decrypted file to storage on the target device for access through the interface.

12. A Self-Service Terminal (SST), comprising:
at least one processor,
a display, and
a secure communication manager configured to: i) execute on the at least one processor, ii) receive a portable device identifier for a portable device from a server, iii) obtain a portable device public key from a list of portable device public keys maintained on the SST using the portable device identifier, iv) obtain a file on the SST, v) encrypt data for the file to produce encrypted data using the portable device public key, vi) encode the encrypted data to produce encrypted and encoded data, vi) break the encrypted and encoded data into portions, vii) render the portions on a screen of the display as animated graphical images as a transmission detectable to a camera integrated into a receiving device and pointed at the screen, and viii) render an audio alert notification from a speaker of the SST when the secure communication manager detects that the camera of the receiving device is no longer pointing at the screen and the secure communication manager has not yet rendered all of the animated graphical images within the screen.

* * * * *